Sept. 5, 1967  P. G. WENDT  3,339,990
LUBRICATED BEARING SHOE
Filed July 13, 1964  2 Sheets-Sheet 1

PETER G. WENDT
INVENTOR.

BY Daniel H. Bobis
Atty

Sept. 5, 1967 P. G. WENDT 3,339,990
LUBRICATED BEARING SHOE
Filed July 13, 1964 2 Sheets-Sheet 2

PETER G. WENDT
INVENTOR.

BY Daniel H. Bobis
ATTY

3,339,990
LUBRICATED BEARING SHOE

Peter G. Wendt, Williamsville, N.Y., assignor to Worthington Corporation, Harrison, N.J., a corporation of Delaware
Filed July 13, 1964, Ser. No. 382,125
5 Claims. (Cl. 308—73)

This invention relates generally to pivoted shoes for journal bearings, and specifically to their lubrication.

It is an object of this invention to provide a constant, ample supply of lubricant at all rubbing surfaces of a pivoted shoe for the journal bearing.

It is a further object to supply lubricant under pressure to those rubbing surfaces.

It is a still further object to minimize lubricant leakage during delivery to the rubbing surfaces, without the use of any seals which rapidly break down or loose efficiency during operation.

Among the further objects of the invention, is to provide forced lubrication adequate for the lowest or highest speed of operation, and for either direction of rotation.

An illustration of a device attaining these objectives and advantages by reason of it embodying the invention is shown in the drawings in which.

Figure 1:
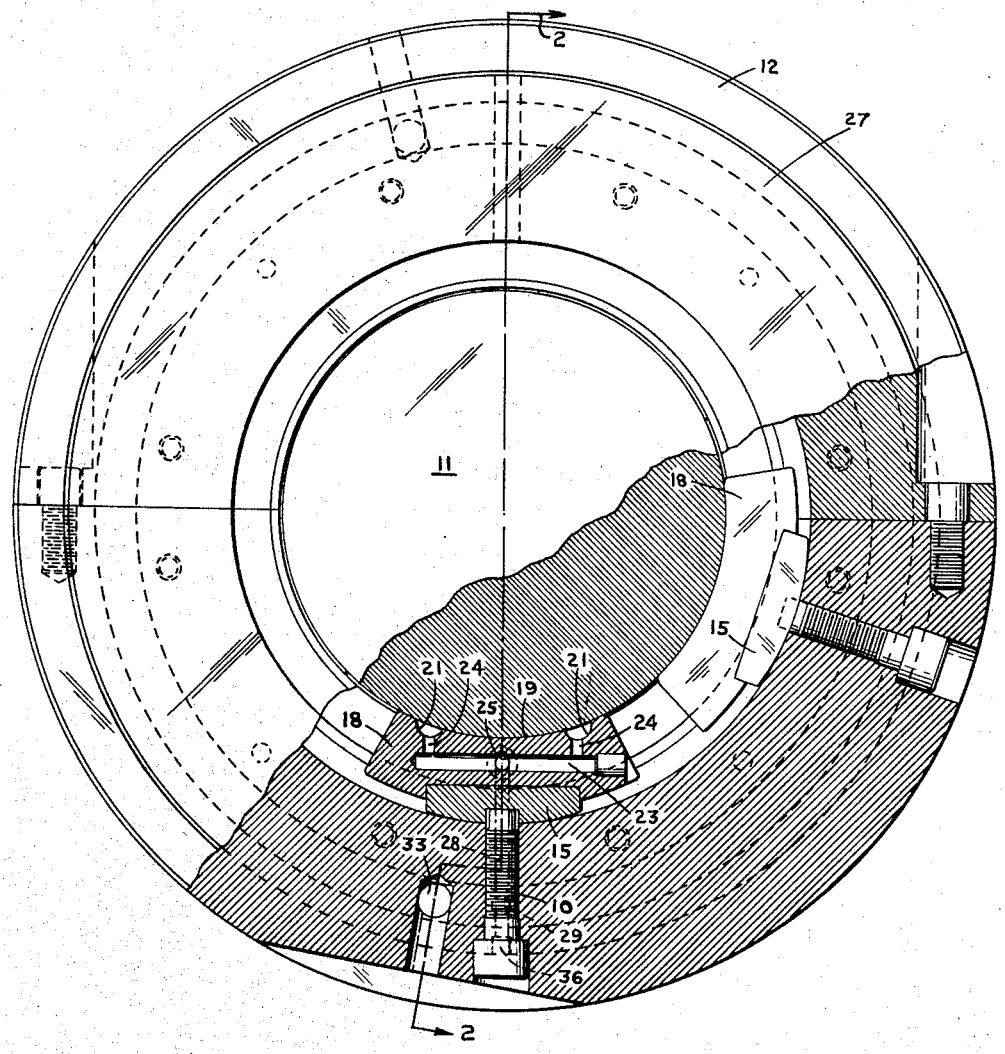
FIGURE 1 is a vertical elevational view, partially sectioned.
Figure 2:
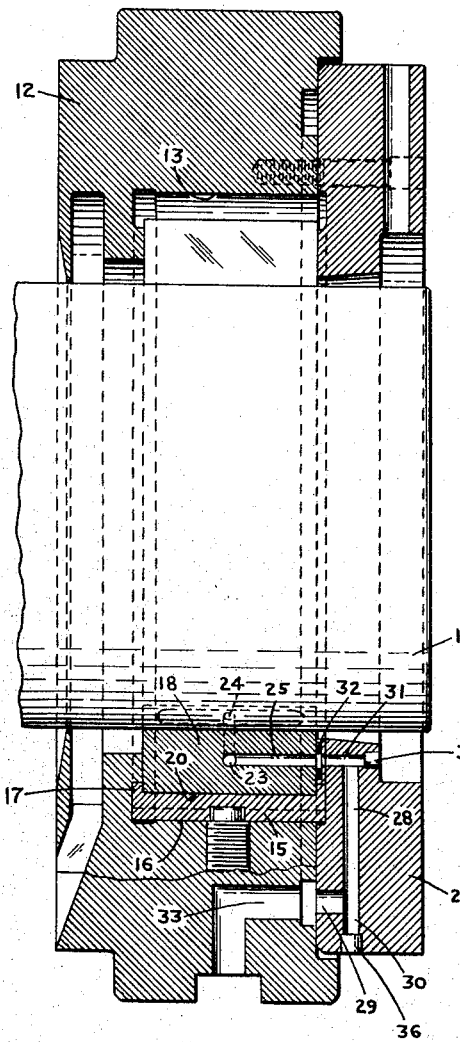
FIGURE 2 is a vertical sectional view taken on the line 2—2 in FIGURE 1.
Figure 3:
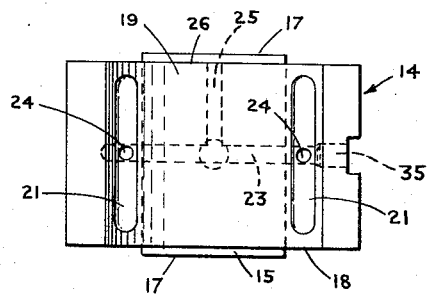
FIGURE 3 is a top plan view of a bearing shoe and pivot block.
Figure 4:
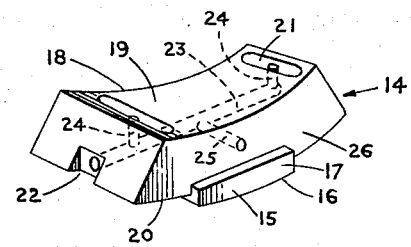
FIGURE 4 is a perspective view of the bearing shoe and pivot block.
Figure 5:
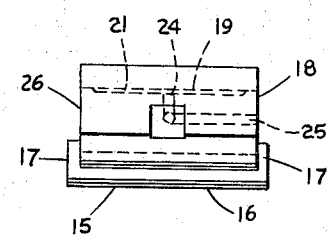
FIGURE 5 is a vertical elevational view of a bearing shoe and pivot block.

In the past, the delivery of lubricant under pressure to the rubbing surfaces of a bearing block has been attended by breakdown of connectors transmitting the lubricant, or leakage at various points, due in part to the pivoting of the bearing shoe and the pivot block. The present invention takes advantage of the fact that the side wall of the bearing block and the housing side plate maintain a substantially constant spatial relation to each other. By utilizing these walls for the placing of lubricant supply conduits which during operation, maintain substantial registration with each other, the necessity for the use of flexible connections, sealed pipes, or other types of connections to deliver the lubricant is avoided. The construction eliminates the very members and seals which are most prone to wear and break down, and assures continuous delivery of lubricant under pressure to the rubbing surfaces.

Referring now to the drawings in detail, there is shown rotating equipment in the nature of a shaft 11. A housing 12 embraces the shaft 11. The housing 12 has a central channel 13 to receive the bearing assembly 14. Pivot blocks 15 are disposed in the channel 13. The pivot blocks 15 have an arcuate peripheral surface 16. The pivot blocks 15 are seated in a channel within the bearing shoe 18. Inwardly radial flanges 17 define a channel to receive a bearing shoe 18. A bolt 10 passes through the housing 12 and engages a bore in the pivot block 15, to position the pivot block in the channel 13, so that it may rock in response to the direction of rotation of the shaft 11.

The shoe 18 as well as the block 15 may be made of steel, but the rubbing or wear surface 19 is of low friction metal bonded thereto in the usual manner. The bearing shoe 18 has the arcuate inner surface 19 in general conformity with the rotating member it supports. Its peripheral surface 20 is in precise conformity with the pivot block 15 by means of a channel, and the two are fastened together in the usual manner. Surface oil recesses 21 which are axially oriented are formed on the rubbing surface 19. A short, generally radial, supply conduit 24 extends from the recesses 21 toward, but not to, the peripheral surface 20. A slot 22 in one end of the shoe 18 defines the start of a longitudinal bore 23 which connects together the conduits 24, 24. A plug 35 closes the end of the bore 23. The middle of the bore 23 is connected to an axial lubricant supply passage 25 which extends to the side wall 26 of the bearing shoe 18, in general parallelism with the shaft 11.

With the bearing assembly 14 positioned in the housing 12, a bearing retainer 27 is bolted to the housing. A lubricant conduit 28 through the retainer 27 is provided. It has an inlet portion 29, connected to a radial passage 30, which in turn is connected to a discharge portion 31. A plug 36 closes the end of bore 30. The outer end of the discharge portion 31 is positioned in registration with the passage 25 in the shoe 18. A plug 37 closes the outer end of bore 31. The inner end of the discharge portion is enlarged and defines a seat for an O-ring 32. As the bearing assembly 14 rocks, the discharge portion 31 and the passage 25 will always be in substantial registration with each other and the O-ring 32, engaging the side wall 26 will ensure the delivery of lubricant with relatively slight leakage and reduction of pressure, for the movements of the adjacent side wall 26 and the retainer 27 with respect to each other are generally parallel. Thus, the lubricant passes between two parallel surfaces without loss of pressure. The maintenance of lubricant pressure to the axial recesses 21 by delivery of lubricant through the axial passage 31 in the retainer to the axial passage 25 in the shoe 18 prevents cavitation of the lubricant column, or lubricant turbulence, so that there is no physical contact between the rubbing surface 19 and the shaft 11; there is always an oil film between them. Regardless of the direction of rotation, the oil film is always sustained.

The lubricant supply to the conduit 28 in the retainer 27 is delivered from the passage 33 through the housing 12. In this manner, delivery of lubricant in the more conventional manner between two surfaces that rock with respect to each other (the arcuate surface 16 of the pivot block 15 rocking in the channel 13 in the housing 12) is avoided, in favor of delivery of lubricant between two surfaces that wipe each other in constantly spaced relation during rocking (the side wall 26 of the shoe 18 and the inner face of the retainer 27). Positive delivery of lubricant under constant pressure is assured.

The foregoing description illustrates only one embodiment of the invention. There are known equivalents of the components which may be substituted or rearranged without departing from the spirit of the invention.

What is claimed is:

1. A lubricated bearing shoe assembly for a journal bearing that supports rotating equipment comprising:
   (a) a housing;
   (b) a bearing shoe in the housing;
   (c) a shaft supported by the bearing shoe;
   (d) a pivot block rockably supporting the shoe in the housing;
   (e) a retainer attached to the housing and defining a side wall therefor;
   (f) a lubricant supply passage through the retainer, generally parallel to the axis of the shaft;
   (g) an axial lubricant passage in the side wall of the bearing shoe, disposed in registration with the end of the supply passage through the retainer;
   (h) an oil recess in the top of the bearing shoe; and
   (i) means communicating the oil recess to the axial passage.

2. A lubricated bearing shoe assembly for a journal bearing that supports rotating equipment comprising:
(a) a housing;
(b) a bearing shoe in the housing;
(c) a shaft supported by the bearing shoe;
(d) a retainer attached to the housing and defining a side wall therefor;
(e) a lubricant supply passage through the retainer, generally parallel to the axis of the shaft;
(f) a lubricant passage in the side wall of the bearing shoe, generally parallel to the axis of the shaft and disposed in registration with the end of the supply passage through the retainer;
(g) an oil recess in the top of the bearing shoe; and
(h) means communicating the oil recess with the lubricant passage in the bearing shoe.

3. A lubricant bearing shoe assembly for a journal bearing that supports rotating equipment comprising:
(a) a housing;
(b) a bearing shoe in the housing;
(c) a shaft supported by the bearing shoe;
(d) a lubricant passage in the side wall of the bearing shoe, generally parallel with the axis of the shaft;
(e) a lubricant supply passage in the housing generally parallel to and in direct registration with the lubricant passage in the bearing shoe;
(f) an oil recess in the top of the bearing shoe communicating with the lubricant passage in the side wall of the bearing shoe.

4. A lubricated bearing shoe assembly for a journal bearing comprising:
(a) a rotatable shaft;
(b) a bearing shoe operatively associated with and supporting the shaft;
(c) a housing operatively receiving the bearing shoe in supporting relation;
(d) a shaft lubricant passage means including a lubricant passage in the side wall of the bearing shoe, generally parallel with the axis of the shaft; and
(e) a lubricant supply passage in the housing generally parallel to and in direct registration with the lubricant passage in the bearing shoe.

5. In a journal bearing that supports rotating equipment, a lubricated bearing shoe assembly comprising:
(a) a housing defining a cylindrical surface in axial alignment with the rotating equipment and radially spaced therefrom;
(b) a bearing shoe in the housing;
(c) a retainer attached to the housing and defining a side wall therefor;
(d) a lubricant supply passage through the retainer generally parallel with the axis of the cylindrical surface;
(e) a lubricant passage in the side wall of the bearing shoe in registration with the end of the supply passage through the retainer;
(f) an oil recess in the top of the bearing shoe; and
(g) means communicating the oil recess with the lubricant passage.

References Cited

UNITED STATES PATENTS

| 1,486,115 | 3/1924 | Allen | 308—122 X |
| 2,348,928 | 5/1944 | Sampatacos | 308—73 |
| 2,363,260 | 11/1944 | Peskin. | |
| 2,621,086 | 12/1952 | King | 308—122 X |
| 3,004,804 | 10/1961 | Pinkus et al. | 308—73 |
| 3,022,123 | 2/1962 | Gruber | 308—73 |
| 3,093,426 | 6/1963 | Cornford | 308—73 |
| 3,180,351 | 4/1965 | Wolfensperger | 137—246.18 |

FOREIGN PATENTS 301,506  10/1929  Great Britain.

MARTIN SCHWADRON, *Primary Examiner.*

FRED C. MATTERN, *Examiner.*

R. F. HESS, *Assistant Examiner.*